3,324,890
SOLENOID VALVE HAVING CONTROLLED
RETARDATION OF SPOOL MOTION
Charles H. Whitmore, Burnsville, and Sheldon E. Thorson, Minneapolis, Minn., assignors to Continental Machines, Inc., Savage, Minn., a corporation of Minnesota
Filed June 9, 1965, Ser. No. 462,551
13 Claims. (Cl. 137—625.69)

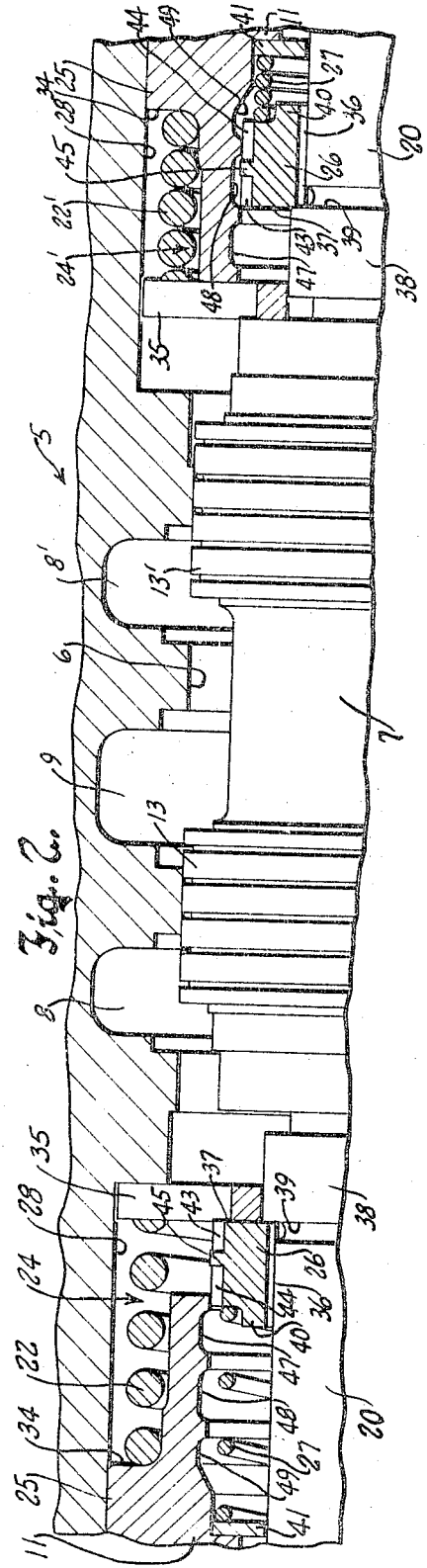
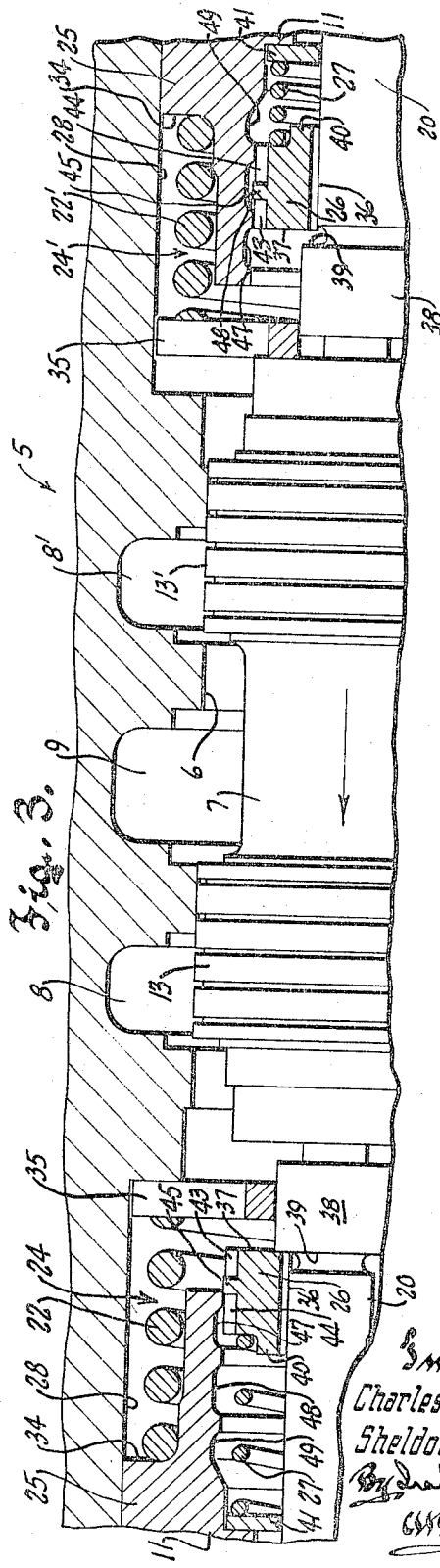

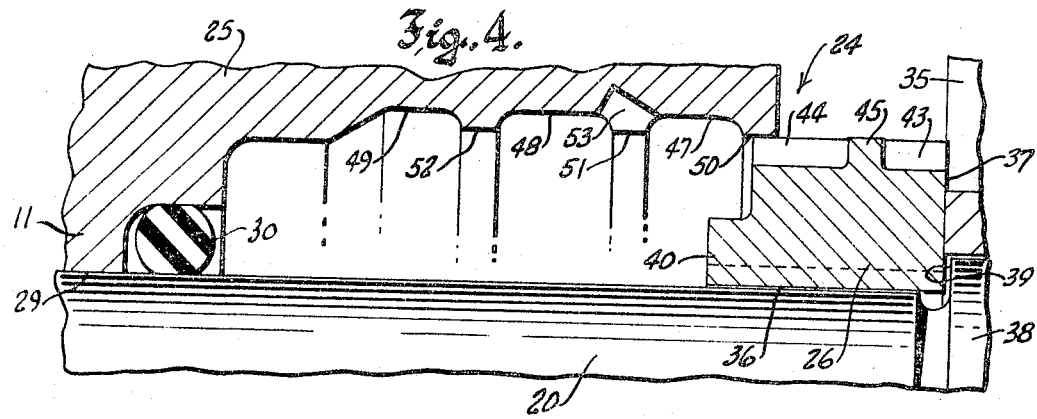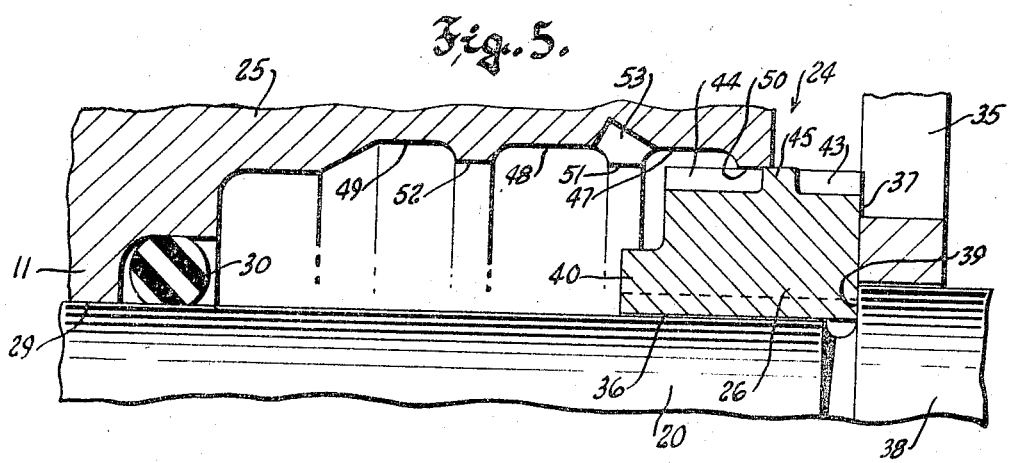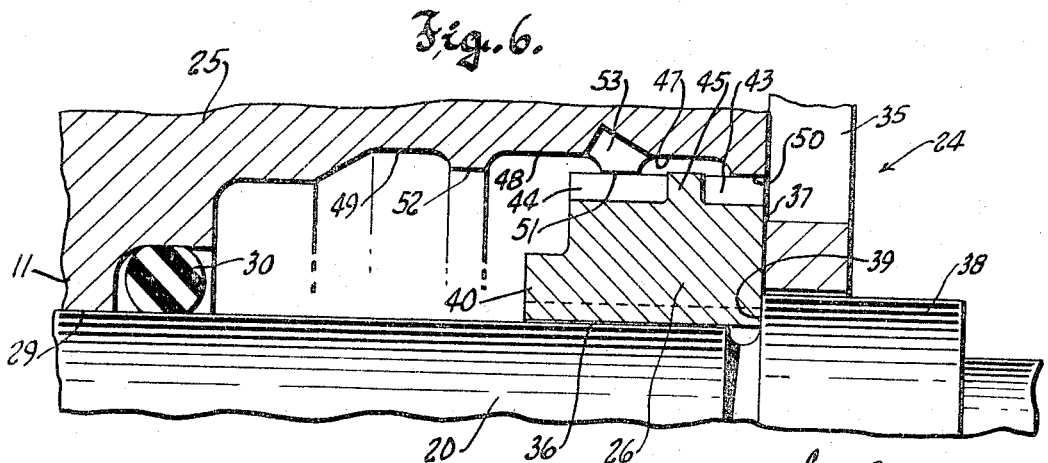

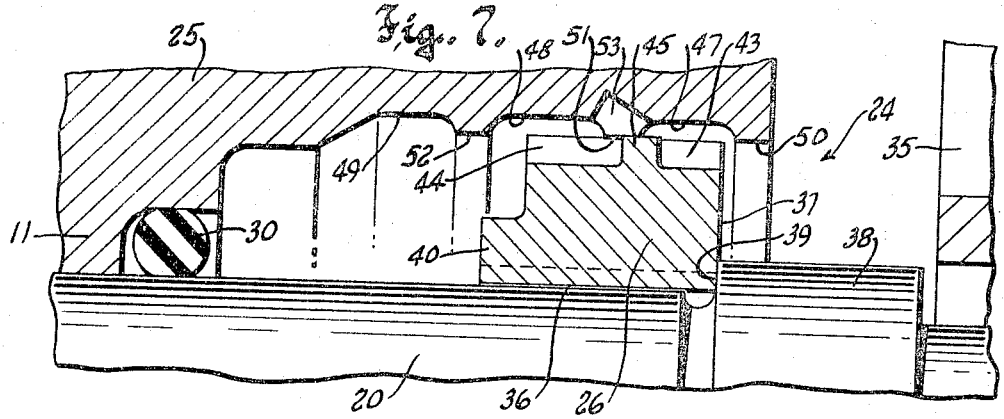
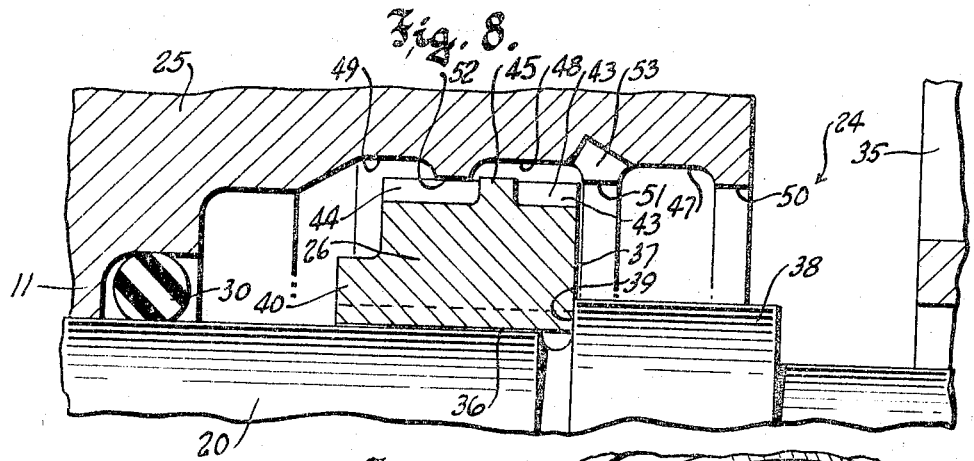
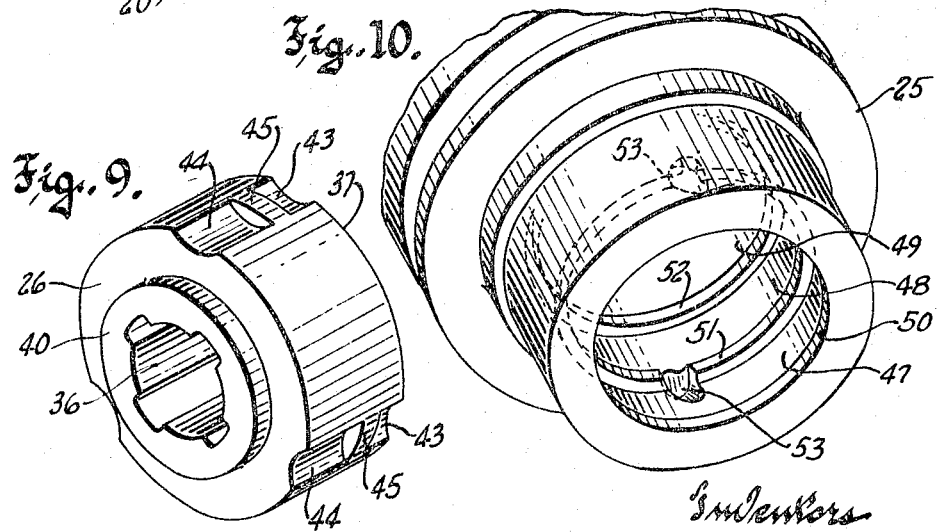
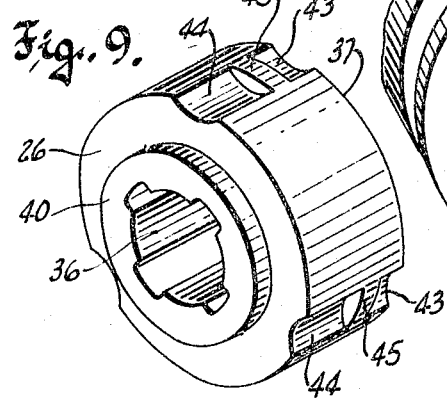
INVENTORS
Charles H. Whitmore
Sheldon E. Thorson United States Patent Office 3,324,890
Patented June 13, 1967

This invention relates to a solenoid actuated valve mechanism having a novel and improved dashpot incorporated therein to prevent the mechanism from causing surge pressures and mechanical shocks in a pressure fluid system in which the mechanism is installed.

A solenoid operated valve mechanism is normally very fast in operation, and in fact it is one of the advantages of such a mechanism that its valve element can be moved from a valve fully open position to a valve fully closed position in a small fraction of a second. However when such a mechanism is used in a high pressure hydraulic system, the rapid closure of the valve can produce extremely high surge pressures in the fluid of the system, due to the resultant abrupt termination of fluid flow through the valve. For example, the abrupt closure of a fully open valve in a hydraulic system operating at a pressure of 1,000 p.s.i. has been found to produce momentary surge pressures as high as 3,500 p.s.i.

Such surge pressures, which are similar in nature to the "water hammer" sometimes encountered in water supply systems, are obviously undesirable. At best they bring about rough machine action; but by their very nature they impose high stresses on machine and system parts, and they can therefore result in ruptured hydraulic system lines and broken components.

While abrupt closure of a hydraulic system valve is thus undesirable, the obvious alternative of moving the valve element slowly through its range of travel is, in many cases, at least equally undesirable.

With the foregoing considerations in mind it is a general object of this invention to provide a solenoid actuated valve mechanism which has a substantially rapid action through the major portion of the travel of its valve element, but which provides for retardation of motion of the valve element as the same nears its closed position, so that in the final stages of valve closure fluid flow through the valve mechanism is diminished gradually and smoothly, to thus avoid high surge pressures in the fluid system controlled by the valve mechanism.

Another object of this invention is to provide a solenoid operated valve mechanism of the character described having dashpot means which is effective to damp or retard motion of the valve element of the mechanism when the same is nearing its closed position, but not at times when rapid motion of the valve element is tolerable, and wherein such dashpot means is adapted for incorporation in a generally conventional solenoid valve mechanism without requiring substantial modification thereof and without adverse effect upon operation of the solenoid by which the valve element is actuated.

A further object of this invention is to provide a solenoid actuated valve mechanism of the character described having dashpot means whereby the valve element can be retarded during a limited portion of its travel to its valve closed position, when it is effecting the final stage of valve closure, and whereby, if desired, the valve element can also be retarded in the initial stage of valve opening, all without impeding motion of the valve element in other portions of its travel, so as to provide a valve mechanism which is generally fast acting but which does not produce mechanical shocks and pressure surges in a hydraulic system in which it is installed.

From the foregoing it will be seen that it is another object of the present invention, in one of its aspects, to provide an improved dashpot mechanism of the type comprising a cylinder which is closed at one end and a mating piston, which dashpot affords damping of the motion of a part with which it is connected through only a predetermined portion or portions of the total travel of said part, leaving the part substantially unimpeded in other portions of its travel.

In this connection it is also a specific object of this invention to provide a dashpot which affords different degrees of retardation of a movable part in different portions of the travel of the part.

An additional and more specific object of this invention is to provide a solenoid actuated valve mechanism incorporating a dashpot of the character just described, which mechanism has means providing a unidirectional driving connection between the dashpot and the valve element of the mechanism, whereby the dashpot can retard motion of the valve element only when the latter is in a predetermined portion or portions of its travel in one direction, and wherein said unidirectional driving connection means also serves as a check valve that controls flow of fluid through the piston of the dashpot to allow the piston to have rapid relative movement through all portions of its stroke in the opposite direction.

In general the objects of the invention set forth above are attained by means of a dashpot comprising cooperating cylinder and piston members, wherein said members have radial recesses in their opposing side surfaces, the recesses in each member being axially spaced apart to define between them an unrecessed surface portion that extends substantially completely around the member at one axial zone thereof, the recesses in each member providing for unrestricted flow of fluid over the unrecessed surface portion on the other member except when the unrecessed surface portions on the two members are juxtaposed, whereupon said unrecessed surface portions cooperate to restrict fluid flow along the piston member.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate one complete example of the physical embodiment of the invention constructed according to the best mode so far devised for the practical application of the principles thereof, and in which:

FIGURE 2 is a fragmentary longitudinal sectional view of the same solenoid valve mechanism, on a larger scale, showing the conditions of the dashpot units and valve element when the left-hand solenoid is energized and the valve element is in its right-hand operative position;

FIGURE 3 is a view similar to FIGURE 2 but showing the conditions that exist when the valve element is moving from its right-hand operative position toward its neutral or centered position;

FIGURE 4 is a fragmentary longitudinal sectional view on a still larger scale, showing the relationship between the cylinder and piston members of the left-hand dashpot unit when the valve element is in its right-hand operative position, corresponding to the condition illustrated in FIGURE 2;

FIGURE 5 is a view similar to FIGURE 4 but illustrating the conditions that exist as the valve element returns from its right-hand operative position toward its neutral position and at the point where it begins to be retarded prior to effecting complete closure;

FIGURE 6 is a view similar to FIGURE 4 but showing the conditions that exist when the valve element is in its neutral position;

FIGURE 7 is a view similar to FIGURE 4 but showing the conditions that exist when the right-hand solenoid is energized and the valve element has just opened the valve in the course of motion toward its left-hand operative position;

FIGURE 8 is a view similar to FIGURE 4 but showing the conditions that exist when the right-hand solenoid is energized and the valve element is in its left-hand operative position;

FIGURE 9 is a perspective view of the piston of a dashpot unit in the solenoid valve mechanism of this invention; and FIGURE 10 is a perspective view of the cylinder of the dashpot unit.

Figure 1:
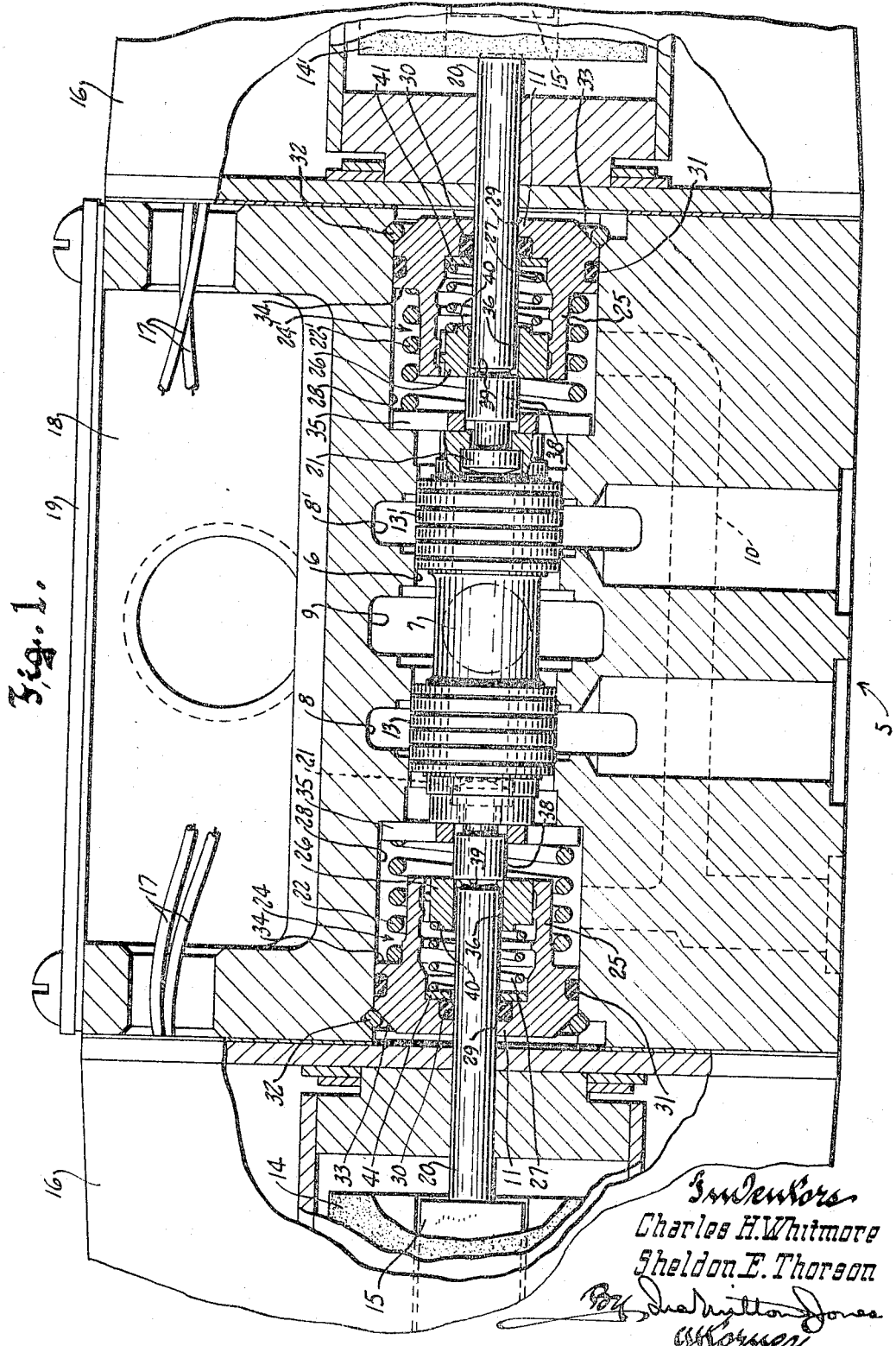
FIGURE 1 is a view in longitudinal section of the main portion of a solenoid valve mechanism incorporating dashpot units embodying the principles of this invention.

Referring now more particularly to the accompanying drawings, the numeral 5 designates generally the body of a solenoid valve, in which there is a bore 6 wherein a valve element or spool 7 is slideable in opposite axial directions between a neutral position and a pair of operative positions. The valve body 5 is generally conventional in that the bore 6 therein is intersected by a pair of outlet service passages 8 and 8', a pressure fluid inlet passage 9, and a return fluid passage 10, all of which open to the usual ports at the exterior of the body for connection to appropriate components of a hydraulic pressure fluid system. As is also conventional, the bore 6 is intersected at its middle by the inlet passage 9, while the service passages 8 and 8' communicate with the bore at zones thereof spaced axially to opposite sides of its communication with the inlet passage; and the return fluid passage 10 is branched to intersect the bore at a pair of zones axially outward of its intersections with the service passages.

The valve element or spool 7 has a pair of axially spaced lands 13 and 13' which, in the neutral position of the spool, block flow of fluid from the inlet passage 9 to both of the service passages 8 and 8'. When the spool is shifted to either side of its neutral position, to one or the other of its operative positions, the lands 13 and 13' on the spool cooperate with the valve body in a known manner to divert fluid from the inlet passage to one of the service passages 8 or 8', and simultaneously provide for connection of the other service passage with the return fluid passage 10.

The valve spool 7 is actuated to its operative positions by means of a pair of solenoids 14 and 14', one at each end of the valve body, each coaxial with the bore 6 in the valve body, and each having a plunger 15. A cup-shaped housing member 16 can be attached to each end of the valve body to provide an enclosure for the solenoid thereat. Conductors 17 for connecting the solenoids with a current source extend into a cavity 18 in the top of the valve body which is closed by a removable cover plate 19 to provide a junction box.

Each solenoid, when energized, pushes the valve element in the direction away from itself, motion of the solenoid plunger 15 being transmitted to the valve element by means of a coaxial stem or pusher 20 which accommodates any slight misalignment between the solenoid plunger and the valve element. The axially outer end of each stem 20 abuts its cooperating solenoid plunger, and the inner end of the stem has a bi-directional motion transmitting connection with the valve spool provided by an enlarged head 21 on the stem that is engaged in a mating laterally opening slot in its adjacent end portion of the spool.

The valve element 7 is at all times biased towards its neutral position by means of a pair of opposed centering springs 22 and 22' which are arranged, as described hereinafter, to react between the valve body and the valve element. Hence the valve element can be moved to and maintained in an operative position only in consequence of energization of a solenoid. When the solenoids are de-energized, the spool 7 is promptly returned to its neutral position under the action of the centering springs.

If the motion of the spool were not retarded, it would move so rapidly toward its neutral or closed position under the influence of the centering spring 22 or 22' that valve closing action would be exceedingly abrupt, with the result that mechanical shocks and pressure surges would occur in a hydraulic system in which the mechanism was installed. According to the present invention, however, two dashpot units 24 and 24', one for each direction of valve element motion, retard the valve element just as it is approaching a valve-closed position, but leave it unimpeded during the major portion of its travel in the valve closing direction. Further, the dashpot units in the mechanism of this invention lend themselves to providing the additional important function of retarding valve element motion in the valve opening direction at the time when the valve is "cracking" to initially connect a service passage 8 or 8' with the inlet passage 9, thereby preventing mechanical shocks that might result from excessively abrupt valve opening; but, again, such retardation occurs only during a small portion of opening travel of the valve element, and is accomplished without impeding it during the major portion of its travel to an operative position.

Each dashpot unit 24 and 24' comprises, as best seen in FIGURES 2 and 3, a cylinder 25 having a rear end wall 11, a cooperating piston 26, and a compression spring 27 which biases the piston away from the closed end of the cylinder. The dashpot units are concentrically received in counterbores 28 in the valve body that are coaxial with the bore 6 therein and open to its opposite ends, and in which are also received the centering springs 22 and 22'. Such counterbores and centering springs are normally present in solenoid valve mechanisms, and hence prior solenoid valve mechanisms can be adapted to accommodate the dashpot units of this invention with little or no modification.

The cylinder 25 of each dashpot unit is generally cup-shaped, opening axially inwardly with respect to the bore 6 in the valve body, but it has a coaxial hole 29 in its end wall 11 through which the stem or pusher 20 slideably extends. An O-ring 30 in a coaxial recess in the front surface of the end wall 11 provides a fluid tight seal around the pusher. A larger O-ring 31 is confined between the cylinder and the wall of the valve body counterbore 28 to provide a fluid tight seal between them, said O-ring being seated in a circumferential groove in the cylinder near its end wall 11.

Each dashpot cylinder 25 is confined against axially outward motion in the valve body by means of a retaining ring 32 seated in a circumferential groove in the wall of the counterbore 28 and engaging a circumferential beveled shoulder 33 on the rear of the cylinder. The cylinder is held against the retaining ring 32 under axially outward biasing force exerted by its adjacent return spring 22 or 22', and the cylinder thus cooperates with the retaining ring to carry the reaction force of the return spring into the valve body. The front end portion of the cylinder has a reduced outside diameter to provide a pilot for the return spring and to define a forwardly facing shoulder 34 against which the axially outer end of the return spring is seated. The axially inner end of the return spring is engaged against a spider-like spring seat member 35 which is carried on the stem 20 and which bears against the adjacent end surface of the valve element 7.

The piston 26 of each dashpot unit has a coaxial bore 36 through which the stem or pusher 20 extends with a loose fit, said bore preferably being of non-circular cross-section, as best seen in FIGURE 9, to provide a passage along which hydraulic fluid can readily flow through the piston and into the closed end portion of the cylinder. The front end surface 37 of the piston, which faces axially into the bore 6 in the valve body, is flat to provide a valve seat around the mouth of the passage bore 36, and the stem 20 has an enlarged diameter portion 38 that defines a flat valve surface 39 which faces said front end surface 37 on the piston and is engageable therewith to block flow of fluid through the passage bore 36, as best seen in FIGURES 2 and 3.

On its rear end, projecting into the cylinder, each piston has a coaxial small diameter pilot portion 40 which provides a seat for the front end portion of the dashpot spring 27. The rear end of said spring is seated against a washer 41 which flatwise overlies the front surface of the cylinder end wall and serves as a retainer for the O-ring 30. It will be observed that the dashpot spring 27 urges the piston axially inwardly with respect to the bore 6, away from the closed end of the cylinder, and hence tends to maintain the front valve seat surface 37 on the piston engaged with the valve surface shoulder 39 on the stem 20.

The feature of retarding the valve element only in predetermined and limited portions of its range of motion is attained by providing the opposing circumferential surfaces of the cylinder and piston members of each dashpot unit with axially spaced apart radial recesses, the recesses in each member defining between them an unrecessed surface portion that extends substantially completely around the member at an axial zone thereof, and the recesses in each member providing for unrestricted flow of fluid over the unrecessed surface portion of the other member except when the unrecessed surface portions on the two members are juxtaposed, whereupon said unrecessed surface portions cooperate to restrict fluid flow along the piston member.

As shown in the accompanying drawings, the radial recesses in the piston comprise pairs of axially extending grooves 43 and 44 (best seen in FIGURE 9) in its outer circumferential surface, the grooves of each pair being lengthwise aligned with one another and axially spaced apart, and the pairs of grooves being circumferentially equispaced around the piston. The ungrooved surface portion of the piston member, between the adjacent ends of each pair of grooves 43 and 44, comprises a circumferentially short land 45, and the several lands 45 are radially aligned with one another and cooperate with the circumferential piston surface between them to define an axial zone of unrecessed surface on the piston that extends completely around it.

In this case the radial recesses in the cylinder (see FIGURE 10) constitute enlargements of its bore, as at 47, 48 and 49, so that the unrecessed portions of the cylinder member constitute lands 50, 51 and 52 which extend substantially completely around it at axially spaced zones. One of these lands, designated by 50 is illustrated as being at the front of the cylinder, another land 52 is spaced a distance forwardly of the end wall 11 of the cylinder, and the third land 51 is about midway between the lands 50 and 52.

As will appear more particularly from the following description, the axial spacing of the lands or unrecessed zones 50 and 51 on the cylinder relative to one another and to the unrecessed zone on the piston determines the portion or portions of the rearward piston stroke at which the dashpot unit effects retardation of the valve element. This is because retardation can occur only when the unrecessed zone on the piston (comprising the lands 45) is juxtaposed to a land on the cylinder, so that flow of fluid along the piston is then restricted to that which can escape from the cylinder through the clearance space between the juxtaposed lands.

It should be noted at this point that in the particular dashpot unit herein shown and described the rearmost land 52 in the cylinder is not utilized to perform a retarding function but merely serves to afford sliding guidance to the piston as it moves rearward into the cylinder. The middle land 51 likewise serves only for guidance of the piston, in the illustrated embodiments of the invention, inasmuch as it has axially extending grooves or notches 53 therethrough at diametrically opposite locations. Without the notches 53, however, the middle land 51 would perform a retarding function as explained hereinafter.

Assume now that both solenoids 14 and 14' are unenergized and that the centering springs 22 and 22' have established the valve element 7 in its neutral or centered position illustrated in FIGURE 1. Under these conditions the piston member 26 of each dashpot unit 24 and 24' will be so located with respect to its cooperating cylinder member 25 that the unrecessed surface portion of the piston, comprising the circumferentially short lands 45, is disposed about midway between the lands 50 and 51 on the cylinder, as best seen in FIGURE 6, which shows only the left-hand dashpot unit 24.

If now the left-hand solenoid 14 is energized for a time, the valve element will be moved to and maintained in its right-hand operative position, in which it provides for communication between the inlet passage 9 and the right-hand service passage 8'. Under these conditions, which are illustrated in FIGURE 2, the right-hand centering spring 22' is of course compressed, and the piston of the right-hand dashpot unit 24' will be in the rear portion of its cylinder, having been moved thereto, against the bias of its dashpot spring 27, by the right-hand stem or pusher 20, which has its shoulder 39 engaged against the front face of said piston. After the valve element has occupied its right-hand operating position for a moment, the piston of the left-hand dashpot unit 24 will be in its most forward position, in which its unrecessed surface portion 45 is spaced forwardly of the front land 50 on the cylinder, as best seen in FIGURE 4.

When the left-hand solenoid 14 is subsequently de-energized, the right-hand centering spring 22' urges the valve element 7 toward its neutral position with a strong biasing force, and the left-hand dashpot unit 24 controls motion of the valve element. The initial motion of the valve element away from its operative position is quite rapid because the unrecessed zone 45 of the piston of the left-hand dashpot unit 24 is spaced ahead of the front land 50 on its cylinder, permitting substantially unrestricted flow of fluid around the land 50 by way of the rear recesses 44 in the piston. Rapid motion of the valve element in this first stage of valve closing is desirable in order to reduce operating time, and it has no adverse effect upon the hydraulic system because a relatively large amount of valve spool motion effects a proportionately small reduction in the rate of flow of hydraulic fluid through the valve mechanism. However, as the valve spool nears its fully closed position, just before its right-hand land 13' cuts off communication between the inlet passage 9 and the right-hand service passage 8' (see FIGURE 3), it effects a relatively rapid change of flow rate in the hydraulic system in consequence of even a small change in its position, and through this portion of its travel, therefore, the valve element is retarded by the left-hand dashpot unit 24. Said dashpot unit does this because, as best seen in FIGURE 5, the unrecessed zone 45 of its piston is then juxtaposed to the front land 50 on the cylinder, cooperating therewith to substantially restrict flow of fluid along the piston and out of the closed portion of the cylinder behind it.

After the valve element 7 has effected closure, it should travel a small additional distance toward its neutral or fully centered position in order to assure a good seal between the inlet passage 9 and both service passages 8 and 8', and through this final portion of its spring propelled travel it should again be unimpeded. During this final portion of spool travel to neutral position, fluid flow along the piston of the left-hand dashpot unit 24 is once again unrestricted by reason of the fact that the unrecessed zone 45 of the piston is in register with the recess or bore enlargement 47 of its cylinder, whereas the lands 50 and 51 on the cylinder are opposite the radial recesses 43 and 44 respectively in the piston, as best seen in FIGURE 6. Hence a continuous and substantially unrestricted (although somewhat tortuous) passage for fluid flow out of the cylinder can be traced in turn through the recesses 44, 47 and 43.

If now the right hand solenoid 14′ is energized, to shift the valve element 7 to its left-hand operative position, the left-hand dashpot unit 24 could again serve to retard valve element motion, if it did not have the notches 53, but it would do so only during that small portion of spool travel when the left-hand service passage 8 was just beginning to come into communication with the inlet passage 9. During initial motion of the spool away from its centered position, prior to "cracking" of the valve to establish the communication just mentioned, the spool is unretarded because the unrecessed zone 45 on the piston is in register with the recess 47 in the cylinder, the situation being comparable to that illustrated in FIGURE 6.

Just as the valve "cracks," however, the unrecessed zone 45 on the piston comes into juxtaposition to the central land 51 in the cylinder, as illustrated in FIGURE 7, and if the notches 53 are absent from land 51 the radially opposed unrecessed zones of the cylinder and piston members can cooperate to effect substantial restriction of fluid flow along the piston, out of the cylinder therebehind, thus retarding the solenoid produced valve element motion. It will be apparent that the notches 53 will not be used in cases where very abrupt opening of the valve would be undesirable, as where it would cause sudden acceleration of the part controlled by the valve mechanism, with resultant risk of mechanical shock to components of the system in which the valve functions. Where fast opening of the valve can be tolerated, the notches or grooves 53 are of course provided in the land 51, as shown, so that said land is ineffective to produce retardation of the piston but still serves to afford guidance to it.

It will be apparent that the momentary retardation of the valve element just as it is opening would not impose any undue load upon the solenoid, hence no modification of the solenoid in a conventional solenoid valve mechanism would be necessary to accommodate installation therein of dashpot units of this invention without the notches 53.

After the valve element has "cracked," and as it attains a substantially open position, the piston of the left-hand dashpot unit 24 moves to a position (illustrated in FIGURE 8) in which its unrecessed surface portion is spaced behind the land 51 on the cylinder, again permitting substantially unrestricted flow of fluid around the piston by way of the communicated recesses 49, 44, 48 and 43, so that the valve element is unretarded during the final portion of its motion to its left-hand operative position.

It will be understood that when the valve element is moved to the right, the right-hand dashpot unit 24′ serves to retard it as it approaches its closed position from the left-hand operative position, and again (absent the notches 53) just as it opens in the course of solenoid propelled movement from the neutral to the right-hand operative position, all in correspondence with the above described operation of the left-hand dashpot unit 24 during leftward movement of the spool.

Whenever the valve element is moving, the dashpot unit at the end of the valve body from which the spool is retreating is ineffective to retard it. The reason for this is best seen from FIGURE 3, with reference to the right-hand dashpot unit 24′. The opposing surfaces 39 and 37 on the pusher 20 and on the piston 26 provide a unidirectional driving connection which constrains the piston to move with the valve element 7 only when the latter is moving in the direction toward the piston, i.e., to the right in FIGURE 3. When the valve element moves to the left, the piston of the right-hand dashpot unit 24′ is propelled to the left only by the biasing force of dashpot spring 27. However, suction tends to retard the piston in such movement, permitting the valve surface 39 on its adjacent pusher 20 to separate from the front face 37 of the piston, with the result that fluid can flow substantially unrestrictedly through the passage bore 36 in the piston. Hence the piston follows the valve element very closely so that immediately after the valve spool comes to rest, the dashpot unit from which it has retreated is recocked. In a sense, therefore, the cooperating piston and pusher surfaces 39 and 37 function as a check valve by which the passage bore 36 through the piston is closed during its rearward motion and opened during its forward motion.

From what has been said above about the dashpot units of this invention, it will be apparent that each could have an additional land or lands in its cylinder, for retarding the valve element in other portions of its travel; and that for the purposes of special installations any such additional lands could be rendered ineffective to produce retardation by providing them with notches corresponding to the notches 53.

It will likewise be apparent that the amount of retardation of the spool which is effected by each dashpot unit depends upon the clearance space between the unrecessed surface portions of its cylinder and piston members when the same are juxtaposed, so that variation in retarding effect can be achieved by slightly increasing or decreasing the outside diameter of the piston relative to the lands in the cylinder. Obviously the unrecessed zones on the cylinder, the piston, or both, could be made axially wider or narrower, to prolong or diminish the periods of retardation which they afford.

In achieving very precise control of valve spool motion with the dashpot units of this invention it must be borne in mind that the retardation effected by each dashpot unit depends not only upon the clearance between the cylinder and the piston but also, to a certain extent, upon the viscosity of the fluid employed in the system, which usually varies with temperature. Normally the fluid in a hydraulic system becomes warmer and less viscous after a period of operation, with the result that the dashpot units have less retarding effect upon the valve spool. To compensate for the effects of temperature upon the fluid, the piston of each dashpot unit can be made of a material having a substantially higher coefficient of thermal expansion than the cylinder, so that the clearance space between the cylinder and piston members decreases with rising temperature and substantially in proportion to the decrease in fluid viscosity. As an example, an acrylic ("Plexiglas") piston working in a steel cylinder has been found to give almost complete temperature compensation, with substantially uniform retardation throughout the range of operating temperatures of the system.

From the foregoing description taken together with the accompanying drawings it will be apparent that this invention provides a solenoid actuated valve mechanism which avoids fluid surge pressures and mechanical shocks in a hydraulic system in which it is incorporated, and that the invention provides a dashpot unit which is readily adaptable to existing solenoid valves for retarding the valve element only when it is in predetermined portions of its travel, without impeding it at other times.

What is claimed as my invention is:

1. In a valve mechanism having a valve element which is mechanically actuatable in a valve body in opposite axial directions between defined open and closed positions, and which permits communication between passages in the valve body in its open position and blocks such communication in its closed position, means for retarding the valve element when it is moving toward its closed position, but only when it is in the last stage of closing off such communication, so that by such retardation abrupt termination of fluid flow through the passages is prevented but closing of the valve is not substantially delayed, said valve element retarding means comprising:

(A) means in the valve body defining a cylinder member which is closed at one end;

(B) a piston member slideable in said cylinder member toward and from the closed end thereof;

(C) cooperating means on the piston member and on the valve element providing a driving connection between them whereby the piston member is constrained to move toward the closed end of the cylinder member during motion of the valve element toward its closed position; and (D) said cylinder and piston members having radial recesses in their opposing side surfaces, the recesses in each member being axially spaced apart to define between them an unrecessed surface portion that extends substantially completely around the member at one axial zone thereof, the recesses in each member providing for substantially unrestricted flow of fluid over the unrecessed surface portion on the other member except when the unrecessed surface portions on the two members are juxtaposed, whereupon said unrecessed surface portions cooperate to restrict fluid flow along the piston member, and said unrecessed surface portions being so located on the cylinder and piston members as to be juxtaposed when the valve element is in the last stage of closing off communication between said passages in the valve body.

2. The valve mechanism of claim 1, wherein said cooperating means on the piston member and on the valve element provide a unidirectional driving connection between them whereby the valve element is movable toward its open position independently of the piston member, further characterized by the following:

(A) said piston member having an axially extending hole therethrough which provides for substantially unrestricted flow of fluid through the piston member;

(B) check valve means operative to block said hole upon movement of the piston member toward the closed end of the cylinder member and which is open upon movement of the piston member in the opposite direction; and (C) a spring reacting between the cylinder member and the piston member to bias the latter in the direction away from the closed end of the cylinder member.

3. The valve mechanism of claim 2, wherein said check valve means comprises:

(A) means on the end of the piston member remote from the closed end of the cylinder member defining an axially facing surface to which said hole opens; and (B) means movable in unison with the valve element providing an abutment which opposes said surface on the piston member and which is engageable with said surface to cooperate therewith in closing the mouth of said hole and in providing said unidirectional driving connection between the valve element and the piston member.

4. The value mechanism of claim 1, further characterized by the following:

(A) the piston member having a passage extending axially therethrough along which fluid can readily flow into the closed end portion of the cylinder member, and said piston member also having on the end thereof that faces the valve element a valve seat surface that surrounds the mouth of said passage;

(B) a part constrained to move with the valve element and having an abutment that faces axially toward said surface on the piston member and is engageable therewith to provide said driving connection between the valve element and the piston member and to block flow of fluid through said passage, said connection thus being disruptable by motion of the valve element toward its open position whereby also said passage is opened; and (C) a spring reacting between the cylinder member and the piston member to bias the latter away from the closed end of the cylinder member.

5. In a mechanically actuated valve mechanism of the type comprising a valve body having a bore therein, a valve element axially slideable in the bore in opposite directions between a pair of defined positions, a solenoid having a plunger arranged coaxially with the valve element at one end of the valve body, a pusher extending coaxially into the bore and providing a connection between the solenoid plunger and the valve element by which the valve element is moved to its position remote from said end of the valve body upon energization of the solenoid, and spring means for urging the valve element toward its other position, means operative to retard the valve element during motion thereof toward said end of the valve body but ineffective to retard the valve element during is motion in the opposite direction, said last named means comprising:

(A) a dashpot unit in the bore near said end of the valve body comprising a substantially cup-shaped cylinder member and a cooperating piston member, (1) one of said members being coaxially fixed in the bore and having a coaxial hole through which the pusher extends with a slideable sealing fit, and (2) the other of said members having a coaxial hole therethrough which provides a passage for substantially unrestricted flow of fluid and through which the pusher extends with a loose sliding fit, and said other member having a seating surface on its end facing the valve element, surrounding the mouth of said hole;

(B) a spring reacting between the cylinder member and the piston member to bias the movable one of said members in the direction toward the valve element; and (C) means on the pusher providing a circumferential abutment which opposes said surface on the movable one of said members and which is adapted to engage said surface during motion of the valve element in said one direction to constrain said movable member to move with the valve element and to block flow of fluid through said passage, said abutment being disengageable from said surface on the movable member during motion of the valve element in said opposite direction to permit the valve element to move independently of the movable member and to permit flow of fluid through said passage.

6. The mechanically actuated valve mechanism of claim 5 further characterized by:

said cylinder and piston members having radial recesses in their opposing side surfaces, the recesses in each member being axially spaced apart to define between them an unrecessed surface portion that extends substantially completely around the member at one axial zone thereof, the recesses in each member providing for substantially unrestricted flow of fluid over the unrecessed surface portion on the other member except when the unrecessed surface portions on the two members are juxtaposed, whereupon said unrecessed surface portions cooperate to restrict fluid flow along the piston member, and said unrecessed surface portions being so located on the cylinder and piston members as to be juxtaposed when the valve element is in the portion of its travel toward said end of the valve body at which it effects the last stage of closure of the valve mechanism.

7. In a mechanically actuated valve mechanism of the type comprising a valve body having a bore therein, a valve element axially slideable in the bore in opposite directions between defined valve open and valve closed positions, and mechanical means for actuating the valve element to each of its said positions, means for retarding the valve element during motion toward its closed position, but only through a predetermined portion of its travel at which it is effecting the last stage of closure of the valve, in order to prevent abrupt termination of fluid flow through the valve mechanism without substantially delaying closing of the valve, said valve element retarding means comprising:

cooperating cylinder and piston members,
(1) one of said members being fixed in the valve body in coaxial relation to the valve element,
(2) the other of said members being so connected with the valve element as to be constrained to motion in unison with it toward its closed position,
(3) said cylinder member being closed at one end, and
(4) said cylinder and piston members having radial recesses in their opposing side surfaces, the recesses in each member being axially spaced apart to define between them an unrecessed surface portion that extends substantially completely around the member at one axial zone thereof, the recesses in each member providing for substantially unrestricted flow of fluid over the unrecessed surface portion on the other member except when the unrecessed surface portions on the two members are juxtaposed, whereupon said unrecessed surface portions cooperate to restrict fluid flow along the piston member, and
(5) said recesses being so located on the cylinder and piston members that said unrecessed surface portions on the members are juxtaposed when the valve element is in the last stage of closing off communication between said passages in the valve body.

8. The mechanically actuated valve mechanism of claim 7 wherein said other of the cooperating cylinder and piston members is so connected with the valve element as to be movable independently thereof when the valve element moves toward its open position, further characterized by:

(A) said other member having a coaxial hole therethrough which provides a passage along which fluid can flow substantially unrestrictedly and having a flat surface facing axially toward the valve element and surrounding the mouth of said hole;
(B) means connected with the valve element for motion in both directions with the same, said means having a flat surface which opposes said surface on said other member and is abuttingly engageable therewith upon motion of the valve element toward its closed position to block flow of fluid through said passage; and
(C) spring means reacting between the cylinder and piston member to urge said other member in the direction toward the valve element.

9. In a mechanically actuated valve mechanism of the type comprising a valve body having a bore therethrough, a valve element axially slideable in the medial portion of the bore in opposite directions from a neutral valve-closed position to each of a pair of operative valve-open positions, and a pair of solenoids, one at each end of the valve body, disposed coaxially with the valve element, each having a plunger that is moveable inwardly relative to the bore in consequence of energization of the solenoid:

(A) a pair of pushers, one for each solenoid, each extending coaxially through an end portion of the bore in the valve body and having a bidirectional motion transmitting connection with the valve element and a motion transmitting connection with the plunger of its solenoid whereby axially inward motion of the plunger is transmitted to the valve element to move the same to one of its operative positions;
(B) a pair of cylinder members, each coaxially disposed in an end portion of said bore and having an axially outermost end wall through which a pusher extends with a close sliding fit, each of said cylinder members having a reduced outside diameter on the portion thereof remote from said end wall defining a circumferential shoulder that faces into the bore;
(C) means in the valve body, near each end of said bore, for retaining each cylinder member against axially outward displacement in the bore and for providing a seal around each cylinder member;
(D) a centering spring surrounding said reduced diameter portion of each cylinder member and engaged against said circumferential shoulder thereon;
(E) seat means cooperating with each of said centering springs and the valve element for imposing the reaction forces of the centering springs upon the valve element in such a manner as to urge the latter toward its neutral position;
(F) a mating piston member for each cylinder member, each of said piston members having a coaxial hole through which a pusher extends with a sliding fit and which provides a passage for substantially unrestricted flow of fluid along the piston member, and each piston member having a flat end surface facing the valve element and surrounding the mouth of said hole;
(G) means on each pusher defining an axially facing flat circumferential shoulder that opposes said end surface on the piston member and is abuttingly engageable with the same to provide a unidirectional driving connection between the valve element and the piston member and to block flow of fluid through said passage; and
(H) a spring reacting between each cylinder member and its mating piston member to bias the latter in the direction toward the valve element.

10. The mechanically actuated valve mechanism of claim 9, further characterized by:

each of said cylinder members and its mating piston member having radial recesses in their opposing side surfaces, the recesses in each of said mating members being axially spaced apart to define between them an unrecessed surface portion that extends substantially completely around the member at one axial zone thereof, the recesses in each of said members providing for substantially unrestricted flow of fluid over the unrecessed surface portion on the mating member except when the unrecessed surface portions on the two mating members are juxtaposed, whereupon said unrecessed surface portions cooperate to restrict flow along the exterior of the piston member, said recesses in the mating members being so positioned that juxtaposition of their unrecessed surface portions occurs when the valve member is near its neutral position.

11. The solenoid valve mechanism of claim 10, further characterized by:

the mating cylinder and piston members being made of materials having unlike coefficients of expansion, the piston member having the higher coefficient of expansion so that decrease in fluid viscosity with increasing temperature is compensated for by decreased clearance between the unrecessed surface portions of the mating cylinder and piston members.

12. A dashpot of the type comprising a cylinder memmber having a closed end and a piston member slideable in the cylinder member and along the side of which fluid flows in consequence of relative reciprocation of the members, one of said members being fixed and the other being connectable with a reciprocatory part to move therewith, said dashpot providing for retarding of the reciprocatory part through a predetermined portion of its motion without substantially impeding said part in other portions of its motion, and said dashpot being characterized by:

radial recesses in the opposing side surfaces of said members, the recesses in each member being axially spaced apart to define between them an unrecessed surface portion that extends substantially completely around the member at one axial zone thereof the recesses in each member providing for substantially unrestricted flow of fluid over the unrecessed surface portion on the other member except when the unrecessed surface portions on the two members are juxtaposed, whereupon said unrecessed surface portions cooperate to restrict fluid flow along the piston member.

13. In apparatus of the type having a part that is movable in opposite directions through a predetermined travel and means for moving said part in each of said directions at a substantially fast rate, dashpot means for retarding the part during its motion in one direction through a predetermined portion of said travel without otherwise impeding its motion, said dashpot means comprising:

(A) cooperating cylinder and piston members, said cylinder member having a closed end,
  (1) one of said members being fixed and having its axis aligned with the directions of motion of the part,
  (2) the other member being movable and having a coaxial hole therethrough which provides a passage along which fluid can flow substantially unrestrictedly and having a valve seating surface surrounding the mouth of said hole and facing in the direction opposite to said one direction of motion of the part, and
  (3) said cylinder and piston members having radial recesses in their opposing side surfaces, the recesses in each member being spaced apart to define between them an unrecessed surface portion that extends substantially completely around the member at one axial zone thereof, the recesses in each member providing for substantially unrestricted flow of fluid over the unrecessed surface portion on the other member except when the unrecessed surface portions on the two members are juxtaposed whereupon said unrecessed surface portions cooperate to restrict fluid flow over the piston member and thus impede relative motion between the members;

(B) a spring reacting between the cylinder and piston members to bias the movable one of said members in said one direction of motion of the part; and (C) means connected with the part for motion in unison therewith providing an abutment which faces in said one direction of motion and is engageable with said surface on the movable member to constrain the movable member to motion in said one direction with the part and to block flow of fluid through said passage, disengagement of said abutment from said surface upon motion of the part in the opposite direction permitting fluid to flow through said passage and enabling said movable member to move independently of the part in response to the bias of said spring.

References Cited
UNITED STATES PATENTS 2,916,019   12/1959   Murphy _____ 137—625.65

M. CARY NELSON, *Primary Examiner.*